United States Patent
Chen

(10) Patent No.: US 12,262,256 B2
(45) Date of Patent: Mar. 25, 2025

(54) HANDOVER CONFIGURATION METHOD AND TERMINAL DEVICE

(71) Applicant: VIVO MOBILE COMMUNICATION CO., LTD., Guangdong (CN)

(72) Inventor: Li Chen, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 341 days.

(21) Appl. No.: 17/671,208

(22) Filed: Feb. 14, 2022

(65) Prior Publication Data

US 2022/0167220 A1 May 26, 2022

Related U.S. Application Data

(63) Continuation of application No. PCT/CN2020/109192, filed on Aug. 14, 2020.

(30) Foreign Application Priority Data

Aug. 14, 2019 (CN) .......................... 201910750300.4

(51) Int. Cl.
- H04W 36/00 (2009.01)
- H04W 36/24 (2009.01)
- H04W 36/32 (2009.01)

(52) U.S. Cl.
CPC ...... H04W 36/0055 (2013.01); H04W 36/249 (2023.05); H04W 36/324 (2023.05)

(58) Field of Classification Search
None
See application file for complete search history.

(56) References Cited

U.S. PATENT DOCUMENTS

| 10,194,357 B2 | 1/2019 | Lee et al. |
| 2013/0039250 A1 | 2/2013 | Hsu |

(Continued)

FOREIGN PATENT DOCUMENTS

| CN | 101572920 A | 11/2009 |
| CN | 101577949 A | 11/2009 |

(Continued)

OTHER PUBLICATIONS

The First Office Action of Priority Application No. CN 201910750300.4 issued by the Chinese Patent Office on Mar. 16, 2021.

(Continued)

*Primary Examiner* — Walter J Divito
(74) *Attorney, Agent, or Firm* — IP & T GROUP LLP

(57) ABSTRACT

A handover configuration method includes: receiving target handover configuration information and handover configuration valid information, the handover configuration valid information including valid area information and/or valid timer information, the valid area information being used for indicating a valid area of at least part of the target handover configuration information, the valid timer information being used for indicating a valid duration of at least part of the target handover configuration information; keeping at least part of the target handover configuration information valid in a case that a current cell of the terminal device is located in the valid area, in a case that a current moment is within (Continued)

the valid duration, or in a case that a current cell of the terminal device is located in the valid area and a current moment is within the valid duration.

20 Claims, 4 Drawing Sheets

(56) References Cited

U.S. PATENT DOCUMENTS

| | | | |
|---|---|---|---|
| 2014/0334366 A1 | 11/2014 | Hsu et al. | |
| 2016/0316432 A1* | 10/2016 | Hsu | H04W 36/0072 |
| 2019/0059031 A1 | 2/2019 | Hahn et al. | |
| 2019/0380081 A1 | 12/2019 | Chang et al. | |
| 2021/0068016 A1* | 3/2021 | Shi | H04W 36/0085 |

FOREIGN PATENT DOCUMENTS

| | | |
|---|---|---|
| CN | 102355692 A | 2/2012 |
| CN | 102932836 A | 2/2013 |
| CN | 105075350 A | 11/2015 |
| CN | 107872851 A | 4/2018 |
| CN | 109392031 A | 2/2019 |
| JP | 2016521495 A | 7/2016 |
| WO | 2010/017012 A1 | 2/2010 |
| WO | 2017/061642 A1 | 4/2017 |
| WO | 2018/113661 A1 | 6/2018 |
| WO | 2018/175721 A1 | 9/2018 |

OTHER PUBLICATIONS

The Second Office Action of Priority Application No. CN 201910750300.4 issued by the Chinese Patent Office on Jul. 28, 2021.
International Search Report and Written Opinion of International Application No. PCT/CN2020/109192 issued by the Chinese Patent Office on Nov. 16, 2020.
Ericsson, On Validity Timer for Conditional Handover in NR, 3GPP TSG RAN WG2 #106, R2-1906221 (Revision of R2-1903526), May 13-18, 2019, Reno, USA.
Examination Report for the Indian Patent Application No. 202217007744 issued by the Indian Patent Office on Jun. 24, 2022.
Extended European Search Report for the European Patent Application No. 20852277.1 issued by the European Patent Office on Sep. 16, 2022.
Office Action for the Japanese Patent Application No. 2022-508939 issued by the Japanese Patent Office on Feb. 21, 2023.
Office Action for the Japanese Patent Application No. 2022-508939 issued by the Japanese Patent Office on Jul. 18, 2023.
Decision of Refusal for the Japanese Patent Application No. 2022-508939 issued by the Japanese Patent Office on Jan. 9, 2024.

* cited by examiner

Send target handover configuration information and handover configuration valid information to a terminal device — S301
FIG. 3
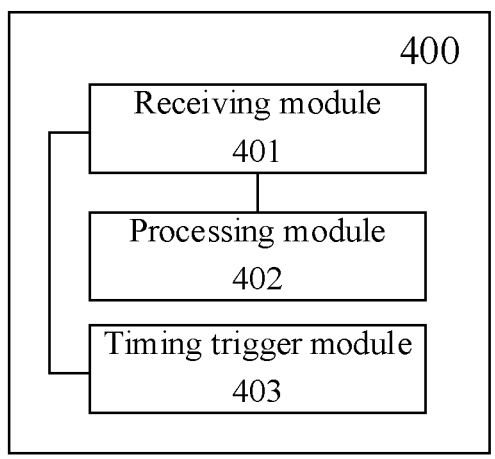
FIG. 4
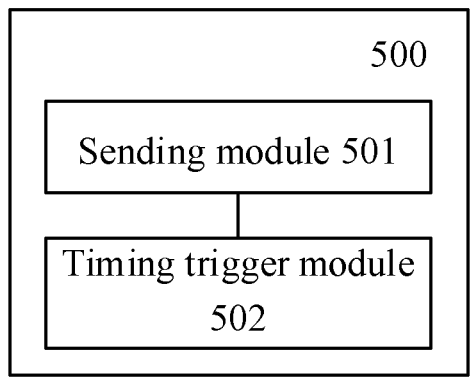
FIG. 5

HANDOVER CONFIGURATION METHOD AND TERMINAL DEVICE

CROSS-REFERENCE TO RELATED APPLICATIONS

This application is a Bypass Continuation Application of PCT/CN2020/109192 filed in Aug. 14, 2020, which claims the priority of Chinese Patent Application No. 201910750300.4 filed on Aug. 14, 2019, the entire content of which are hereby incorporated by reference.

TECHNICAL FIELD

Embodiments of the present disclosure relate to the field of communication technologies, and in particular, to a handover (HO) configuration method, a network device, a terminal device, and a storage medium.

BACKGROUND

A terminal device may implement the transfer of access from a source cell to a target cell under the control of a radio access network (RAN). That is, the terminal device implements a handover between cells.

In a handover process of the terminal device, the network side needs to perform a handover configuration for the terminal device through signaling. After the terminal device successfully accesses the target cell or the terminal device fails to access the target cell, the handover configuration of the terminal device becomes invalid. In a case that there are a plurality of candidate cells for the terminal device, the network side needs to frequently perform a handover configuration for the terminal device through signaling, causing increased signaling overheads.

SUMMARY

Embodiments of the present disclosure provide a handover configuration method, a network device, a terminal device and a storage medium.

According to a first aspect, the embodiments of the present disclosure further provide a handover configuration method, applied to a terminal device, the method including: receiving target handover configuration information and handover configuration valid information that are sent by a network device, the handover configuration valid information including valid area information and/or valid timer information, the valid area information being used for indicating a valid area of at least part of the target handover configuration information, the valid timer information being used for indicating a valid duration of at least part of the target handover configuration information: keeping at least part of the target handover configuration information valid in a case that a current cell of the terminal device is located in the valid area: or keeping at least part of the target handover configuration information valid in a case that a current moment is within the valid duration: or keeping at least part of the target handover configuration information valid in a case that a current cell of the terminal device is located in the valid area and a current moment is within the valid duration.

According to a second aspect, the embodiments of the present disclosure provide a handover configuration method, applied to a network device, the method including: sending target handover configuration information and handover configuration valid information to a terminal device, the handover configuration valid information including valid area information and/or valid timer information, the valid area information being used for indicating a valid area of at least part of the target handover configuration information, the valid timer information being used for indicating a valid duration of at least part of the target handover configuration information, where at least part of the target handover configuration information of the terminal device is kept valid in a case that a current cell of the terminal device is located in the valid area, or at least part of the target handover configuration information of the terminal device is kept valid in a case that a current moment is within the valid duration, or at least part of the target handover configuration information of the terminal device is kept valid in a case that a current cell of the terminal device is located in the valid area and a current moment is within the valid duration.

According to a third aspect, the embodiments of the present disclosure provide a terminal device, including: a receiving module, configured to receive target handover configuration information and handover configuration valid information that are sent by a network device, the handover configuration valid information including valid area information and/or valid timer information, the valid area information being used for indicating a valid area of at least part of the target handover configuration information, the valid timer information being used for indicating a valid duration of at least part of the target handover configuration information; and a processing module, configured to keep at least part of the target handover configuration information valid in a case that a current cell of the terminal device is located in the valid area: or configured to keep at least part of the target handover configuration information valid in a case that a current moment is within the valid duration: or configured to keep at least part of the target handover configuration information valid in a case that a current cell of the terminal device is located in the valid area and a current moment is within the valid duration.

According to a fourth aspect, the embodiments of the present disclosure provide a network device, including: a sending module, configured to send target handover configuration information and handover configuration valid information to a terminal device, the handover configuration valid information including valid area information and/or valid timer information, the valid area information being used for indicating a valid area of at least part of the target handover configuration information, the valid timer information being used for indicating a valid duration of at least part of the target handover configuration information, where at least part of the target handover configuration information of the terminal device is kept valid in a case that a current cell of the terminal device is located in the valid area, or at least part of the target handover configuration information of the terminal device is kept valid in a case that a current moment is within the valid duration, or at least part of the target handover configuration information of the terminal device is kept valid in a case that a current cell of the terminal device is located in the valid area and a current moment is within the valid duration.

According to a fifth aspect, the embodiments of the present disclosure provide a terminal device, including a processor, a memory, and a computer program stored in the memory and executable on the processor, where the computer program is executed by the processor to implement the steps of the foregoing handover configuration method in the technical solution of the first aspect.

According to a sixth aspect, the embodiments of the present disclosure provide a network device, including a processor, a memory, and a computer program stored in the memory and executable on the processor, where the computer program is executed by the processor to implement the steps of the foregoing handover configuration method in the technical solution of the second aspect.

According to a seventh aspect, the embodiments of the present disclosure provide a non-transitory computer-readable storage medium, storing a computer program, where the computer program is executed by a processor to implement the steps of the handover configuration method in the technical solution of the first aspect or the steps of the handover configuration method in the technical solution of the second aspect.

BRIEF DESCRIPTION OF THE DRAWINGS

The present disclosure may be better understood through the following description of the specific implementations of the present disclosure with reference to the accompanying drawings. The same or similar reference numerals in the drawings represent the same or similar features.

FIG. 3 is a flowchart of an example of a handover configuration method according to another embodiment of the present disclosure:

FIG. 4 is a schematic structural diagram of an example of a terminal device according to an embodiment of the present disclosure:

FIG. 5 is a schematic structural diagram of an example of a network device according to an embodiment of the present disclosure:

DETAILED DESCRIPTION

The following clearly describes the technical solutions in the embodiments of the present disclosure with reference to the accompanying drawings in the embodiments of the present disclosure. Apparently, the described embodiments are some of the embodiments of the present disclosure rather than all of the embodiments. All other embodiments obtained by a person of ordinary skill in the art based on the embodiments of the present disclosure shall fall within the protection scope of the present disclosure.

Embodiments of the present disclosure provide a handover configuration method, a network device, a terminal device, and a storage medium, which is applied to a scenario in which a network device performs a handover configuration on a terminal device. The network device may be a device such as a base station or a control node. This is not limited herein. The terminal device may be a device such as a user equipment (UE). This is not limited herein. In the embodiments of the present disclosure, a valid area or a valid duration may be set. Within the valid area and the valid duration, the handover configuration information of the terminal device is kept valid.

Figure 1:
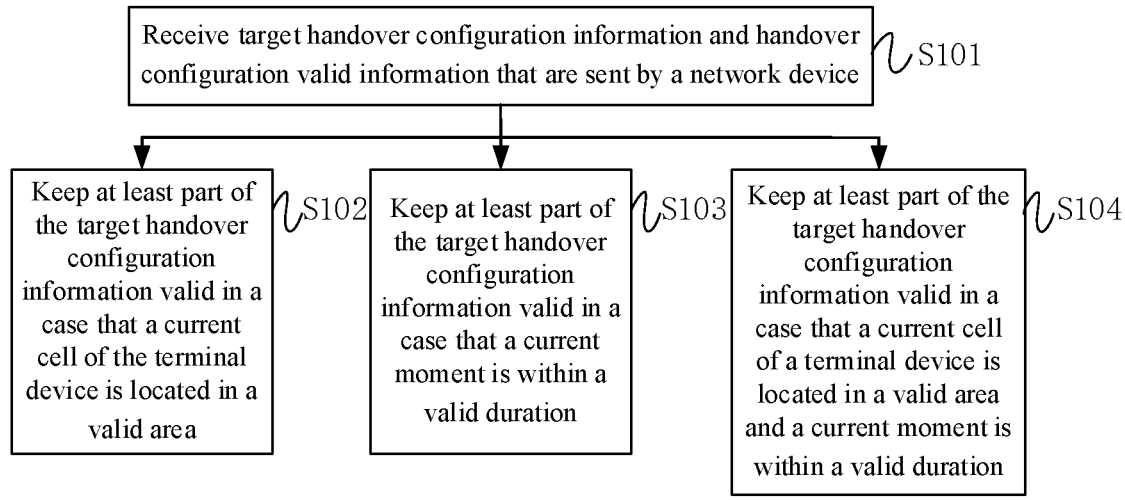
FIG. 1 is a flowchart of an example of a handover configuration method according to an embodiment of the present disclosure.

FIG. 1 is a flowchart of an example of a handover configuration method according to an embodiment of the present disclosure. The handover configuration method is applied to a terminal device. As shown in FIG. 1, the handover configuration method may include step S101 to step S104.

Step S101: Receive target handover configuration information and handover configuration valid information that are sent by a network device.

The target handover configuration information is handover configuration information sent by the network device. In some examples, the target handover configuration information includes one or more of the following: a handover command, mobility control information, a conditional handover (CHO) trigger condition, a measurement configuration, a measurement target configuration, a measurement report configuration, or a random access channel (RACH) configuration of a candidate cell.

The handover command or the mobility control information carries the target handover configuration information. The CHO trigger condition is a trigger condition of a CHO.

The measurement configuration may include a measurement object or the like. The measurement report configuration may include a measurement report or the like. The candidate cell is a cell that the terminal device may choose to access.

The handover configuration valid information may include valid area information and/or valid timer information.

The valid area information is used for indicating a valid area of at least part of handover configuration information. A current cell of the terminal device is located in the valid area, and at least part of the target handover configuration information of the terminal device is kept valid.

In some examples, the valid area information may include one or more of the following: an index of the valid area, a cell identifier (ID) corresponding to the valid area, a RAN notification area configuration (AC) corresponding to the valid area, a RAN notification area corresponding to the valid area, or a tracking area code (TAC) corresponding to the valid area.

The index of the valid area is used for identifying the valid area. There may be a plurality of cell IDs corresponding to the valid area. The plurality of cell IDs corresponding to the valid area may form a cell ID list corresponding to the valid area. The RAN notification AC may be a public land mobile network (PLMN) RAN AC (PLMN RAN AC)). There may be a plurality of PLMN RAN ACs. A plurality of RAN notification areas corresponding to the valid area may form a RAN notification area list corresponding to the valid area. There may be a plurality of RAN notification areas corresponding to the valid area. The plurality of RAN notification areas corresponding to the valid area may form a RAN notification area list corresponding to the valid area. There may be a plurality of TACs corresponding to the valid area. The plurality of TACs corresponding to the valid area may form a TAC list corresponding to the valid area.

In some examples, the valid area information is carried in a broadcast message. Optionally, the valid area information may be carried in a system information block (SIB) of the broadcast message. In a case that the valid area information is carried in the broadcast message, the valid area information represents the valid area of the target handover configuration information of all terminal devices in the current cell.

In some other examples, the valid area information is carried in a dedicated radio resource control (RRC) message.

The dedicated RRC message may include a handover command, mobility control information, a preset RRC message or the like. The preset RRC message may be a newly designed RRC message. This is not limited herein. In a case that the valid area information is carried in the dedicated RRC message, the valid area information represents a valid area of a target handover configuration information of a terminal device that receives the dedicated RRC message.

The valid timer information is used for indicating a valid duration of at least part of the handover configuration information. Within the valid duration, at least part of the target handover configuration information of the terminal device is kept valid.

In some examples, the valid timer information is carried in a broadcast message. Optionally, the valid timer information may be carried in a SIB of the broadcast message.

In some other examples, the valid timer information is carried in a dedicated RRC message. The dedicated RRC message may include a handover command, mobility control information, a preset RRC message or the like. The preset RRC message may be a newly designed RRC message. This is not limited herein.

It should be noted that, in a case that the handover configuration valid information includes the valid area information and the valid timer information, the valid timer information and the valid area information may be carried together in the SIB of the broadcast message or may be carried in the dedicated RRC message. Alternatively, the valid timer information is carried in the SIB of the broadcast message, and the valid area information is carried in the dedicated RRC message. Further alternatively, the valid area information is carried in the SIB of the broadcast message, and the valid timer information is carried in the dedicated RRC message.

In some examples, the terminal device triggers timing of a timer when the target handover configuration information is received or within a first preset time period after the target handover configuration information is received. A duration measured by the timer is the valid duration.

In some other examples, timing of a timer is triggered when the network device sends the target handover configuration information or within a second preset time period after the network device sends the target handover configuration information. A duration measured by the timer is the valid duration.

The first preset time period and the second preset time period may be the same or may be different. In a case that the first preset time period and the second preset time period are the same, the first preset time period and the second preset time period may be configured by using one same piece of valid timer information. Details are not described herein.

Step S102: Keep at least part of the target handover configuration information valid in a case that a current cell of the terminal device is located in a valid area.

In a case that the handover configuration valid information includes the valid area information, if the current cell of the terminal device is located in the valid area, indicating that the terminal device is located in the valid area, at least part of the target handover configuration information is kept valid, that is, the target handover configuration information of the terminal device is kept, the target handover configuration information configured by the network device for the terminal device is not released.

The network device actively performs a handover configuration on the terminal device again, that is, sends handover configuration information.

In some examples, the target handover configuration information is kept valid in a case that the current cell of the terminal device is located in the valid area and handover configuration information configured or incrementally configured by the network device is not received.

The network device actively performs a handover configuration on the terminal device again, that is, sends handover configuration information. If the current cell of the terminal device is located in the valid area and handover configuration information configured or incrementally configured by the network device is not received, it indicates that the network device has not performed a handover configuration on the terminal device again. Therefore, it is only necessary to keep original target handover configuration information valid.

In some other examples, in a case that the current cell of the terminal device is located in the valid area and handover configuration information incrementally configured by the network device is received, the incrementally configured handover configuration information is used and handover configuration information that is not incrementally configured in the target handover configuration information is kept valid.

The network device actively performs a handover configuration on the terminal device again, that is, sends handover configuration information. If the current cell of the terminal device is located in the valid area and handover configuration information incrementally configured by the network device is received, indicating that the network device performs a handover configuration again for a handover configuration indicated by part of the target handover configuration information in the original target handover configuration information, the incrementally configured handover configuration information is used, and handover configuration information that is not incrementally configured in the target handover configuration information is kept valid. Compared with a configuration, an incremental configuration can reduce signaling that needs to be sent for a handover configuration, thereby reducing signaling overheads.

In still some other examples, the configured handover configuration information is used in a case that the current cell of the terminal device is located in the valid area and handover configuration information configured by the network device is received.

The network device actively performs a handover configuration on the terminal device again, that is, sends handover configuration information. If the current cell of the terminal device is located in the valid area and handover configuration information configured by the network device is received, it indicates that the network device performs a handover configuration on the terminal device again. Therefore, the handover configuration information configured again by the network device is used.

In a case that the handover configuration valid information includes the valid area information, if the current cell of the terminal device is not located in the valid area, indicating that the terminal device is not located in the valid area, the target handover configuration information is invalid, that is, the target handover configuration information of the terminal device is not kept, and the target handover configuration information configured by the network device for the terminal device is released.

Step S103: Keep at least part of the target handover configuration information valid in a case that a current moment is within a valid duration.

In a case that the handover configuration valid information includes the valid timer information, if the current moment is within the valid duration, indicating that the target handover configuration information of the terminal device is valid at the current moment, at least part of the target handover configuration information is kept valid, that is, the target handover configuration information of the terminal device is kept, and the target handover configuration information configured by the network device for the terminal device is not released.

In a case that the handover configuration valid information includes the valid timer information, if the current moment is beyond the valid duration, indicating that the target handover configuration information of the terminal device is invalid at the current moment, that is, the target handover configuration information of the terminal device is not kept, the target handover configuration information configured by the network device for the terminal device is released.

Step S104: Keep at least part of the target handover configuration information valid in a case that a current cell of a terminal device is located in a valid area and a current moment is within a valid duration.

In a case that the handover configuration valid information includes the valid area information and the valid timer information, if the current cell of the terminal device is located in the valid area and the current moment is within the valid duration, indicating that the terminal device is located in the valid area, the target handover configuration information of the terminal device is valid at the current moment, at least part of the target handover configuration information is kept valid, that is, the target handover configuration information of the terminal device is kept, and the target handover configuration information configured by the network device for the terminal device is not released.

In a case that the handover configuration valid information includes the valid area information and the valid timer information, if the current cell of the terminal device is not located in the valid area or the current moment is beyond the valid duration, the target handover configuration information of the terminal device is invalid, that is, the target handover configuration information of the terminal device is not kept, and the target handover configuration information configured by the network device for the terminal device is released.

The current cell in the foregoing embodiments includes a serving cell of the terminal device, a resident cell in which the terminal device is in an idle state or a resident cell in which the terminal device is in an inactive state.

In the embodiments of the present disclosure, a terminal device may receive handover configuration valid information sent by a network device, the handover configuration valid information including valid area information and/or valid timer information. The valid area information is used for indicating a valid area of at least part of handover configuration information. The valid timer information is used for indicating a valid duration of at least part of the handover configuration information. Within the valid area and/or the valid duration, the terminal device keeps at least part of target handover configuration information valid. In this way, the network device is prevented from frequently performing a handover configuration on the terminal device through signaling, thereby reducing signaling overheads. In addition, the terminal device neither needs to frequently receive handover configuration information nor needs to frequently perform a handover configuration, so that energy consumption of the terminal device is reduced.

Figure 2:
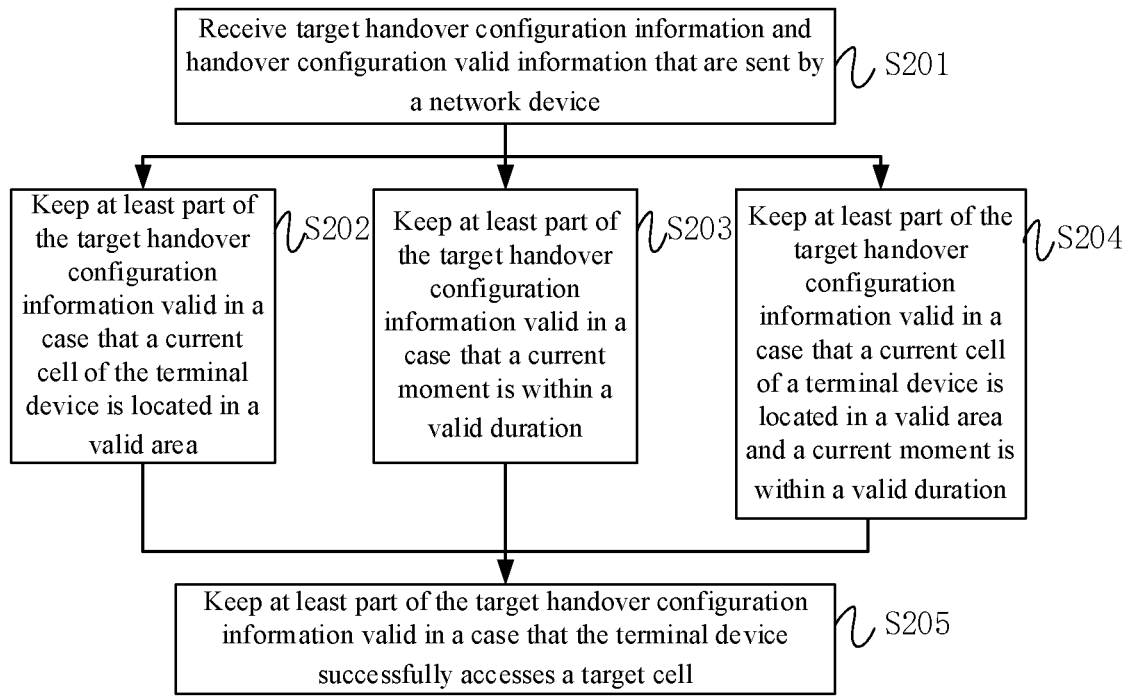
FIG. 2 is a flowchart of another example of a handover configuration method according to an embodiment of the present disclosure.

FIG. 2 is a flowchart of another example of a handover configuration method according to an embodiment of the present disclosure. The handover configuration method is applied to a terminal device. As shown in FIG. 2, the handover configuration method may include step S201 to step S205.

Step S201: Receive target handover configuration information and handover configuration valid information that are sent by a network device.

For related content of step S201, reference may be made to related description of step S101 in the foregoing embodiments. Details are not described herein again.

Step S202: Keep at least part of the target handover configuration information valid in a case that a current cell of the terminal device is located in a valid area.

For related content of step S202, reference may be made to related description of step S102 in the foregoing embodiments. Details are not described herein again.

Step S203: Keep at least part of the target handover configuration information valid in a case that a current moment is within a valid duration.

For related content of step S203, reference may be made to related description of step S103 in the foregoing embodiments. Details are not described herein again.

Step S204: Keep at least part of the target handover configuration information valid in a case that a current cell of a terminal device is located in a valid area and a current moment is within a valid duration.

For related content of step S204, reference may be made to related description of step S104 in the foregoing embodiments. Details are not described herein again.

Step S205: Keep at least part of the target handover configuration information valid in a case that the terminal device successfully accesses a target cell.

That the terminal device successfully accesses the target cell may include that the terminal device is successfully handed over to the target cell or the terminal device reestablishes a communication link with the target cell.

Optionally, at least part of the target handover configuration information may be kept valid in a case that the target cell is located in the valid area.

Optionally, handover configuration information corresponding to a cell in the valid area in the target handover configuration information may be kept valid in a case that the target cell is located in the valid area. For example, assuming that a cell that the terminal device accesses before a handover is a cell A1, the target cell that the terminal device successfully accesses is a cell A2. In a case that the terminal device accesses the cell A1, the target handover configuration information of the terminal device includes handover configuration information of the cell A1, handover configuration information of the cell A2, handover configuration information of a cell A3, handover configuration information of a cell A4, and handover configuration information of a cell A5. The valid area includes the cell A1, the cell A2, and the cell A3. In this case, in a case that the terminal device successfully accesses the target cell, that is, the cell A2, the handover configuration information of the cell A1, the handover configuration information of the cell A2, and handover configuration information of the cell A3 are kept valid, and handover configuration information of the cell A4 and handover configuration information of the cell A5 are invalid.

FIG. 3 is a flowchart of an example of a handover configuration method according to another embodiment of the present disclosure. The handover configuration method is applied to a network device. As shown in FIG. 3, the handover configuration method may include step S301.

Step S301: Send target handover configuration information and handover configuration valid information to a terminal device.

The handover configuration valid information includes valid area information and/or valid timer information. The valid area information is used for indicating a valid area of at least part of the target handover configuration information. The valid timer information is used for indicating a valid duration of at least part of the target handover configuration information.

At least part of the target handover configuration information of the terminal device is kept valid in a case that a current cell of the terminal device is located in the valid area. Alternatively, at least part of the target handover configuration information of the terminal device is kept valid if a current moment is within the valid duration. Alternatively, at least part of the target handover configuration information of the terminal device is kept valid if a current cell of the terminal device is located in the valid area and a current moment is within the valid duration.

In some examples, the valid area information includes one or more of the following: an index of the valid area, a cell ID corresponding to the valid area, a RAN notification AC corresponding to the valid area, a RAN notification area corresponding to the valid area, or a TAC corresponding to the valid area.

In some examples, the handover configuration includes one or more of the following: a handover command, mobility control information, a CHO trigger condition, a measurement configuration, a measurement target configuration, a measurement report configuration, or a RACH configuration of a candidate cell.

The valid area information in the foregoing embodiments may be carried in a broadcast message, and optionally, may be carried in a SIB of the broadcast message. Alternatively, the valid area information may be carried in a dedicated RRC message. The dedicated RRC message may include a handover command, mobility control information or a preset RRC message.

The valid timer information in the foregoing embodiments may be carried in a broadcast message, and optionally, may be carried in a SIB of the broadcast message. Alternatively, the valid timer information may be carried in a dedicated RRC message. The dedicated RRC message may include a handover command, mobility control information or a preset RRC message.

In some examples, the network device may further send configured or incrementally configured handover configuration information to a terminal device in a current cell that is handed over from the valid area, so that the terminal device uses the configured handover configuration information, or so that the terminal device uses the incrementally configured handover configuration information, and keeps handover configuration information that is not incrementally configured in the target handover configuration information valid. Compared with a configuration, an incremental configuration can reduce signaling that needs to be sent for a handover configuration, thereby reducing signaling overheads.

In the foregoing embodiments, in a case that the handover configuration valid information includes the valid timer information, timing of a timer is triggered when the target handover configuration information is sent or within a second preset time period after the target handover configuration information is sent. A duration measured by the timer is a valid duration.

For related content of the target handover configuration information and the handover configuration valid information in the embodiments of the present disclosure, reference may be made to related description of step S101 to step S104 in the foregoing embodiments. Details are not described herein again.

In the embodiments of the present disclosure, a network device sends target handover configuration information and handover configuration valid information to a terminal device. The handover configuration valid information including valid area information and/or valid timer information. The valid area information is used for indicating a valid area of at least part of handover configuration information. The valid timer information is used for indicating a valid duration of at least part of the handover configuration information. Within the valid area and/or the valid duration, the terminal device keeps at least part of the target handover configuration information valid. In this way, the network device is prevented from frequently performing a handover configuration on the terminal device through signaling, thereby reducing signaling overheads. In addition, the terminal device neither needs to frequently receive handover configuration information nor needs to frequently perform a handover configuration, so that energy consumption of the terminal device is reduced.

FIG. 4 is a schematic structural diagram of an example of a terminal device according to an embodiment of the present disclosure. As shown in FIG. 4, a terminal device 400 may include a receiving module 401 and a processing module 402.

The receiving module 401 may be configured to receive target handover configuration information and handover configuration valid information that are sent by a network device.

The handover configuration valid information includes valid area information and/or valid timer information. The valid area information is used for indicating a valid area of at least part of the target handover configuration information. The valid timer information is used for indicating a valid duration of at least part of the target handover configuration information.

The processing module 402 may be configured to keep at least part of the target handover configuration information valid in a case that a current cell of the terminal device is located in the valid area: or configured to keep at least part of the target handover configuration information valid in a case that a current moment is within the valid duration: or configured to keep at least part of the target handover configuration information valid in a case that a current cell of the terminal device is located in the valid area and a current moment is within the valid duration.

In the embodiments of the present disclosure, a terminal device may receive handover configuration valid information sent by a network device, the handover configuration valid information including valid area information and/or valid timer information. The valid area information is used for indicating a valid area of at least part of handover configuration information. The valid timer information is used for indicating a valid duration of at least part of the handover configuration information. Within the valid area and/or the valid duration, the terminal device keeps at least part of target handover configuration information valid. In this way, the network device is prevented from frequently performing a handover configuration on the terminal device through signaling, thereby reducing signaling overheads. In addition, the terminal device neither needs to frequently receive handover configuration information nor needs to frequently perform a handover configuration, so that energy consumption of the terminal device is reduced.

In some examples, the valid area information includes one or more of the following: an index of the valid area, a cell ID corresponding to the valid area, a RAN notification AC corresponding to the valid area, a RAN notification area corresponding to the valid area, or a TAC corresponding to the valid area.

In some examples, the target handover configuration information includes one or more of the following: a handover command, mobility control information, a CHO trigger condition, a measurement configuration, a measurement target configuration, a measurement report configuration, or a RACH configuration of a candidate cell.

The valid area information in the foregoing embodiments may be carried in a SIB of a broadcast message, or may be carried in a dedicated RRC message. The dedicated RRC message may include a handover command, mobility control information or a preset RRC message.

The valid timer information in the foregoing embodiments may be carried in a SIB of a broadcast message, or may be carried in a dedicated RRC message. The dedicated RRC message may include a handover command, mobility control information or a preset RRC message.

The current cell in the foregoing embodiments includes a serving cell of the terminal device, a resident cell in which the terminal device is in an idle state or a resident cell in which the terminal device is in an inactive state.

In some embodiments, the foregoing processing module 402 is further configured to make the target handover configuration information invalid in a case that the current cell of the terminal device is not located in the valid area.

In some embodiments, the foregoing processing module 402 is further configured to make the target handover configuration information invalid in a case that a current moment is beyond the valid duration.

In some examples, the processing module 402 is further configured to: keep the target handover configuration information valid in a case that the current cell of the terminal device is located in the valid area and handover configuration information configured or incrementally configured by the network device is not received; or in a case that the current cell of the terminal device is located in the valid area and handover configuration information incrementally configured by the network device is received, use the incrementally configured handover configuration information and keep handover configuration information that is not incrementally configured in the target handover configuration information valid; or use the configured handover configuration information in a case that the current cell of the terminal device is located in the valid area and handover configuration information configured by the network device is received.

In some embodiments, the processing module 402 is further configured to keep at least part of the target handover configuration information valid in a case that the terminal device successfully accesses a target cell.

In some examples, the processing module 402 is further configured to keep at least part of the target handover configuration information valid in a case that the target cell is located in the valid area.

Optionally, the processing module 402 is further configured to keep handover configuration information corresponding to a cell in the valid area in the target handover configuration information valid in a case that the target cell is located in the valid area.

In some embodiments, the handover configuration valid information includes the valid timer information. As shown in FIG. 4, the terminal device may further include a timing trigger module 403.

The timing trigger module 403 may be configured to trigger timing of a timer when the target handover configuration information is received or within a first preset time period after the target handover configuration information is received: or configured to trigger timing of a timer when the network device sends the target handover configuration information or within a second preset time period after the network device sends the target handover configuration information.

FIG. 5 is a schematic structural diagram of an example of a network device according to an embodiment of the present disclosure. As shown in FIG. 5, a network device 500 may include a sending module 501.

The sending module 501 may be configured to send target handover configuration information and handover configuration valid information to a terminal device.

The handover configuration valid information includes valid area information and/or valid timer information. The valid area information is used for indicating a valid area of at least part of the target handover configuration information. The valid timer information is used for indicating a valid duration of at least part of the target handover configuration information.

At least part of the target handover configuration information of the terminal device is kept valid in a case that a current cell of the terminal device is located in the valid area. Alternatively, at least part of the target handover configuration information of the terminal device is kept valid in a case that a current moment is within the valid duration. Alternatively, at least part of the target handover configuration information of the terminal device is kept valid in a case that a current cell of the terminal device is located in the valid area and a current moment is within the valid duration.

The network device 500 may further include a storage module. The storage module may be configured to store information, programs, and the like required for the network device in the foregoing embodiments to implement the handover configuration method, for example, may store the target handover configuration information, the handover configuration valid information, and the like. This is not limited herein. The sending module 501 may obtain the target handover configuration information, the handover configuration valid information, and the like from the storage module. This is not limited herein.

In the embodiments of the present disclosure, a network device 500 sends target handover configuration information and handover configuration valid information to a terminal device. The handover configuration valid information includes valid area information and/or valid timer information. The valid area information is used for indicating a valid area of at least part of handover configuration information. The valid timer information is used for indicating a valid duration of at least part of the handover configuration information. Within the valid area and/or the valid duration, the terminal device keeps at least part of the target handover configuration information valid. In this way, the network device 500 is prevented from frequently performing a handover configuration on the terminal device through signaling, thereby reducing signaling overheads. In addition, the terminal device neither needs to frequently receive handover configuration information nor needs to frequently perform a handover configuration, so that energy consumption of the terminal device is reduced.

In some examples, the valid area information includes one or more of the following: an index of the valid area, a cell ID corresponding to the valid area, a RAN notification AC corresponding to the valid area, a RAN notification area corresponding to the valid area, or a TAC corresponding to the valid area.

In some examples, the handover configuration includes one or more of the following: a handover command, mobility control information, a CHO trigger condition, a measurement configuration, a measurement target configuration, a measurement report configuration, or a RACH configuration of a candidate cell.

The valid area information in the foregoing embodiments may be carried in a SIB of a broadcast message, or may be carried in a dedicated RRC message. The dedicated RRC message includes a handover command, mobility control information or a preset RRC message.

The valid timer information in the foregoing embodiments may be carried in a SIB of a broadcast message, or may be carried in a dedicated RRC message. The dedicated RRC message includes a handover command, mobility control information or a preset RRC message.

In some examples, the foregoing sending module 501 is further configured to send configured or incrementally configured handover configuration information to a terminal device in a current cell that is handed over from the valid area.

In some embodiments, the handover configuration valid information includes the valid timer information. As shown in FIG. 5, the network device 500 further includes a timing trigger module 502.

The timing trigger module 502 may be configured to trigger timing of a timer when the target handover configuration information is sent or within a second preset time period after the target handover configuration information is sent.

The terminal device provided in the embodiments of the present disclosure can implement various processes implemented by the terminal device in the method embodiments in FIG. 1 and FIG. 2. To avoid repetition, details are not described herein again.

Figure 6:
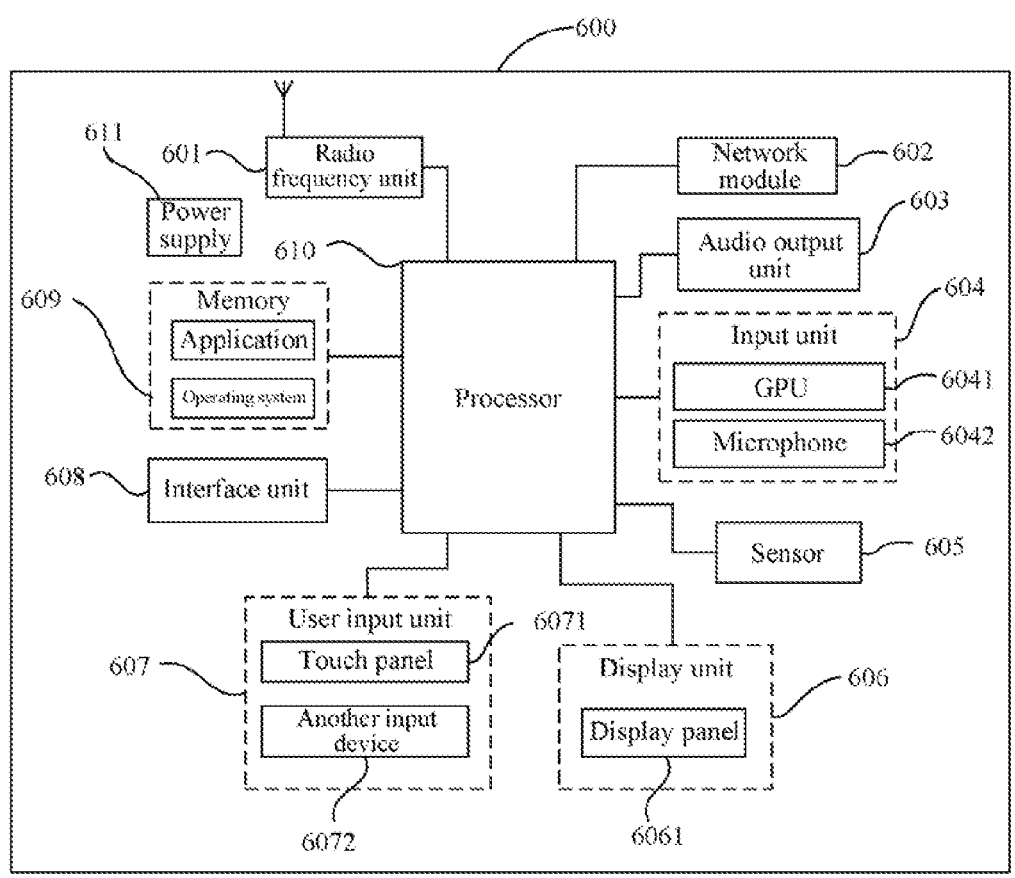
FIG. 6 is a schematic diagram of a hardware structure of an example of a terminal device for implementing embodiments of the present disclosure.

FIG. 6 is a schematic diagram of a hardware structure of an example of a terminal device for implementing embodiments of the present disclosure. A terminal device 600 includes, but is not limited to, components such as a radio frequency unit 601, a network module 602, an audio output unit 603, an input unit 604, a sensor 605, a display unit 606, a user input unit 607, an interface unit 608, a memory 609, a processor 610, and a power supply 611. A person skilled in the art may understand that the structure of the terminal device shown in FIG. 6 constitutes no limitation on the terminal device, and the terminal device may include more or fewer components than those shown in the figure, or some components may be combined, or a different component deployment may be used. In the embodiments of the present disclosure, the terminal device includes, but is not limited to, a mobile phone, a tablet computer, a notebook computer, a palmtop computer, an in-vehicle terminal, a wearable device, a pedometer, and the like.

The radio frequency unit 601 may be configured to receive target handover configuration information and handover configuration valid information that are sent by a network device.

The handover configuration valid information includes valid area information and/or valid timer information. The valid area information is used for indicating a valid area of at least part of the target handover configuration information. The valid timer information is used for indicating a valid duration of at least part of the target handover configuration information.

The processor 610 may be configured to keep at least part of the target handover configuration information valid in a case that a current cell of the terminal device is located in the valid area: or configured to keep at least part of the target handover configuration information valid in a case that a current moment is within the valid duration: or configured to keep at least part of the target handover configuration information valid in a case that a current cell of the terminal device is located in the valid area and a current moment is within the valid duration.

In the embodiments of the present disclosure, a terminal device may receive handover configuration valid information sent by a network device, the handover configuration valid information including valid area information and/or valid timer information. The valid area information is used for indicating a valid area of at least part of handover configuration information. The valid timer information is used for indicating a valid duration of at least part of the handover configuration information. Within the valid area and/or the valid duration, the terminal device keeps at least part of target handover configuration information valid. In this way, the network device is prevented from frequently performing a handover configuration on the terminal device through signaling, thereby reducing signaling overheads. In addition, the terminal device neither needs to frequently receive handover configuration information nor needs to frequently perform a handover configuration, so that energy consumption of the terminal device is reduced.

It should be understood that in the embodiments of the present disclosure, the radio frequency unit 601 may be configured to send and receive a signal during an information receiving and sending process or a call process. For example, the radio frequency unit receives downlink data from a base station, and then delivers the downlink data to the processor 610 for processing; and in addition, sends uplink data to the base station. Generally, the radio frequency unit 601 includes, but is not limited to, an antenna, at least one amplifier, a transceiver, a coupler, a low noise amplifier, a duplexer, and the like. In addition, the radio frequency unit 601 may further communicate with a network and another device through a wireless communication system.

The terminal device provides wireless broadband Internet access for a user by using the network module 602, for example, helps the user to send and receive an email, browse a webpage, and access stream media, and the like.

The audio output unit 603 may convert audio data received by the radio frequency unit 601 or the network module 602 or stored in the memory 609 into an audio signal and output the audio signal as sound. Moreover, the audio output unit 603 may provide an audio output (such as call signal receiving sound or message receiving sound) related to a specific function executed by the terminal device 600. The audio output unit 603 includes a loudspeaker, a buzzer, a receiver, and the like.

The input unit 604 is configured to receive an audio signal or a video signal. The input unit 604 may include a graphics processing unit (GPU) 6041 and a microphone 6042. The GPU 6041 processes image data of a static picture or a video that is obtained by an image acquisition apparatus (for example, a camera) in a video acquisition mode or an image acquisition mode. An image frame that has been processed may be displayed on the display unit 606. The image frame that has been processed by the GPU 6041 may be stored in the memory 609 (or another storage medium) or sent by using the radio frequency unit 601 or the network module 602. The microphone 6042 may receive a sound, and can process the sound into audio data. The processed audio data may be converted, in a phone talk mode, into a format that may be sent to a mobile communication base station via the radio frequency unit 601 for output.

The terminal device 600 further includes at least one sensor 605 such as an optical sensor, a motion sensor, and other sensors. Optionally, the optical sensor includes an ambient light sensor and a proximity sensor, where the ambient light sensor may adjust luminance of the display panel 6061 according to the luminance of the ambient light, and the proximity sensor may switch off the display panel 6061 and/or backlight when the terminal device 600 is moved to the ear. As one type of motion sensor, an acceleration sensor may detect magnitude of accelerations in various directions (generally on three axes), may detect magnitude and a direction of the gravity when static, and may be configured to recognize the attitude of the terminal device (for example, switching between landscape orientation and portrait orientation, a related game, and magnetometer attitude calibration), a function related to vibration recognition (such as a pedometer and a knock), and the like. The sensor 605 may further include a fingerprint sensor, a pressure sensor, an iris sensor, a molecular sensor, a gyroscope, a barometer, a hygrometer, a thermometer, and an infrared sensor, and the like. Details are not described herein again.

The display unit 606 is configured to display information input by the user or information provided for the user. The display unit 606 may include a display panel 6061, and the display panel 6061 may be configured by using a liquid crystal display (LCD), an organic light-emitting diode (OLED), or the like.

The user input unit 607 may be configured to receive input digit or character information, and generate key signal input related to the user setting and function control of the terminal device. Optionally, the user input unit 607 includes a touch panel 6071 and another input device 6072. The touch panel 6071, also referred to as a touchscreen, may collect a touch operation of a user on or near the touch panel (such as an operation of a user on or near the touch panel 6071 by using any suitable object or attachment, such as a finger or a touch pen). The touch panel 6071 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and transmits the touch point coordinates to the processor 610. Moreover, the touch controller receives and executes a command sent from the processor 610. In addition, the touch panel 6071 may be implemented by using various types, such as a resistive type, a capacitive type, an infrared type, and a surface acoustic wave type. In addition to the touch panel 6071, the user input unit 607 may further include the another input device 6072. Optionally, the another input device 6072 may include, but not limited to, a physical keyboard, a functional key (such as a volume control key or a switch key), a track ball, a mouse, and a joystick. Details are not described herein again.

Optionally, the touch panel 6071 may cover the display panel 6061. After detecting a touch operation on or near the touch panel 6071, the touch panel 6071 transfers the touch operation to the processor 610, so as to determine a type of the touch event. Then, the processor 610 provides corresponding visual output on the display panel 6061 according to the type of the touch event. Although, in FIG. 6, the touch panel 6071 and the display panel 6061 are used as two separate parts to implement input and output functions of the terminal device, in some embodiments, the touch panel 6071 and the display panel 6061 may be integrated to implement the input and output functions of the terminal device, which are not limited herein.

The interface unit 608 is an interface for connecting an external apparatus to the terminal device 600. For example, the external apparatus may include a wired or wireless headset port, an external power supply (or a battery charger) port, a wired or wireless data port, a storage card port, a port used to connect an apparatus having an identification module, an audio input/output (I/O) port, a video I/O port, an earphone port, and the like. The interface unit 608 may be configured to receive an input (such as data information or electric power) from an external apparatus and transmit the received input to one or more elements in the terminal device 600 or may be configured to transmit data between the terminal device 600 and an external apparatus.

The memory 609 may be configured to store a software program and various data. The memory 609 may mainly include a program storage region and a data storage region. The program storage region may store an operating system, an application program (such as a sound play function or an image play function) that is required by at least one function, and the like. The data storage region may store data (such as audio data or a phonebook) that is created according to use of the mobile phone, and the like. In addition, the memory 609 may include a high speed random access memory, and may further include a non-volatile memory, such as at least one magnetic disk storage device, a flash memory or another volatile solid-state storage device.

The processor 610 is the control center of the terminal device, and is connected to various parts of the terminal device by using various interfaces and lines. By running or executing the software program and/or module stored in the memory 609, and invoking data stored in the memory 609, the processor 610 performs various functions and data processing of the terminal device, thereby performing overall monitoring on the terminal device. The processor 610 may include one or more processing units. Preferably, the processor 610 may integrate an application processor and a modem processor. The application processor mainly processes an operating system, a user interface, an application, and the like. The modem processor mainly processes wireless communication. It may be understood that the foregoing modem processor may not be integrated into the processor 610.

The terminal device 600 further includes the power supply 611 (such as a battery) for supplying power to the components. Preferably, the power supply 611 may be logically connected to the processor 610 by using a power management system, thereby implementing functions such as charging, discharging, and power consumption management by using the power management system.

In addition, the terminal device 600 includes some functional modules that are not shown. Details are not described herein again.

Preferably, an embodiment of the present disclosure further provides a terminal device, including the processor 610, the memory 609, and a computer program stored in the memory 609 and executable on the processor 610. The computer program implements various processes of the embodiments of the foregoing handover configuration method applied to the terminal device when being executed by the processor 610 and can achieve the same technical effects. To avoid repetition, details are not described herein again.

The network device provided in the embodiments of the present disclosure can implement various processes implemented by the network device in the method embodiment of FIG. 3. To avoid repetition, details are not described herein again.

Figure 7:
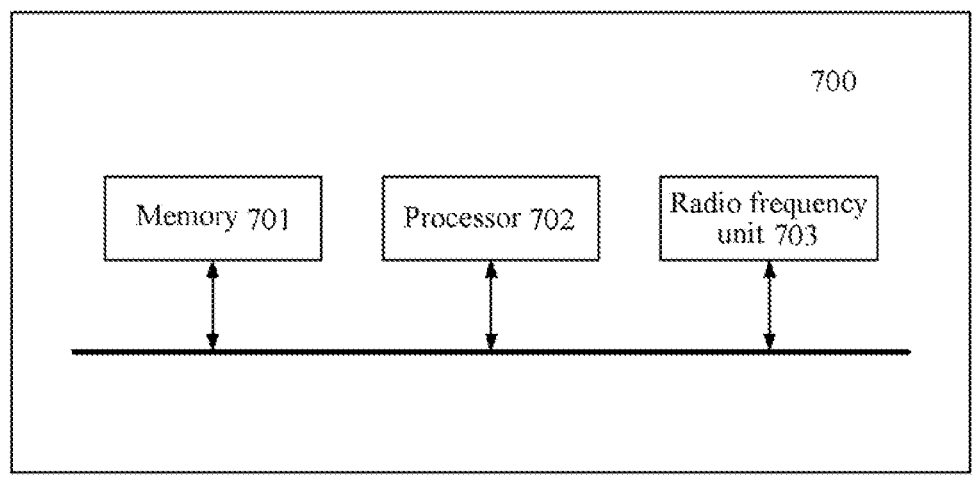
FIG. 7 is a schematic diagram of a hardware structure of an example of a network device for implementing embodiments of the present disclosure.

FIG. 7 is a schematic diagram of a hardware structure of an example of a network device for implementing embodiments of the present disclosure. As shown in FIG. 7, a network device 700 includes a memory 701, a processor 702, a radio frequency unit 703, and a computer program stored in the memory 701 and executable on the processor 702. A person skilled in the art may understand that the structure of the network device shown in FIG. 7 constitutes no limitation on the network device, and the network device may include more or fewer components than those shown in the figure, or some components may be combined, or a different component deployment may be used.

The radio frequency unit 703 is configured to send target handover configuration information and handover configuration valid information to a terminal device.

The handover configuration valid information includes valid area information and/or valid timer information. The valid area information is used for indicating a valid area of at least part of the target handover configuration information. The valid timer information is used for indicating a valid duration of at least part of the target handover configuration information. At least part of the target handover configuration information of the terminal device is kept valid in a case that a current cell of the terminal device is located in the valid area. Alternatively, at least part of the target handover configuration information of the terminal device is kept valid in a case that a current moment is within the valid duration. Alternatively, at least part of the target handover configuration information of the terminal device is kept valid in a case that a current cell of the terminal device is located in the valid area and a current moment is within the valid duration.

In FIG. 7, a bus architecture may include any quantity of interconnected buses and bridges, and specifically connects together circuits that are of one or more processors represented by the processor 702 and of a memory represented by the memory 701. The bus architecture may further connect various other circuits of a peripheral, a voltage regulator, a power management circuit, and the like. This is well known in the art, and therefore, no further description is provided in this specification. The bus interface provides an interface. The radio frequency unit 703 may be a plurality of components, including a transmitter and a receiver, and providing units for communicating with various other apparatuses on a transmission medium, and is configured to send and receive data under control of the processor 702. The processor 702 is responsible for the management of the bus architecture and normal processing, and the memory 701 may store data used when the processor 702 performs an operation.

Preferably, the embodiments of the present disclosure further provide a network device 700, including the processor 702, the memory 701, and a computer program stored in the memory 701 and executable on the processor 702. The computer program is executed by the processor 702 to implement various processes of the embodiments of the foregoing handover configuration method applied to the network device and can achieve the same technical effects. To avoid repetition, details are not described herein again.

In the embodiments of the present disclosure, a network device sends target handover configuration information and handover configuration valid information to a terminal device. The handover configuration valid information includes valid area information and/or valid timer information. The valid area information is used for indicating a valid area of at least part of handover configuration information. The valid timer information is used for indicating a valid duration of at least part of the handover configuration information. Within the valid area and/or the valid duration, the terminal device keeps at least part of the target handover configuration information valid. In this way, the network device is prevented from frequently performing a handover configuration on the terminal device through signaling, thereby reducing signaling overheads. In addition, the terminal device neither needs to frequently receive handover configuration information nor needs to frequently perform a handover configuration, so that energy consumption of the terminal device is reduced.

The embodiments of the present disclosure further provide a non-transitory computer-readable storage medium, storing a computer program, where the computer program is executed by a processor to implement various processes of the embodiments of the foregoing handover configuration method applied to a terminal device or a network device and can achieve the same technical effects. To avoid repetition, details are not described herein again. The non-transitory computer-readable storage medium may include a non-transitory storage medium, and is, for example, a read-only memory (ROM), a random access memory (RAM), a magnetic disk, an optical disc or the like.

The handover configuration method, the network device, the terminal device, and the storage medium in the foregoing embodiments are applied to a normal handover scenario or a CHO scenario. This is not limited herein.

The handover configuration method, the network device, the terminal device, and the storage medium in the foregoing embodiments may be applied to 5G communications systems and subsequent communications systems. This is not limited herein.

The embodiments of this specification are all described in a progressive manner, for same or similar parts in the embodiments, refer to such embodiments, and descriptions of each embodiment focus on a difference from other embodiments. For terminal device embodiments, network device embodiments, and non-transitory computer-readable storage medium embodiments, reference may be made to the description part of the method embodiments for related parts.

It should be noted that the term "include", "comprise" or any other variation thereof in this specification is intended to cover a non-exclusive inclusion, which specifies the presence of stated processes, methods, objects, or apparatuses, but does not preclude the presence or addition of one or more other processes, methods, objects, or apparatuses. Without more limitations, elements defined by the sentence "including one" does not exclude that there are still other same elements in the processes, methods, objects, or apparatuses.

Through the foregoing description on the implementations, a person skilled in the art can clearly learn that the foregoing embodiment methods may be implemented by using software in combination with a necessary universal hardware platform. Certainly, the embodiment methods may also be implemented by using hardware, but the former is a better implementation in many cases. Based on such an understanding, the technical solutions of the present disclosure essentially or the part contributing to the prior art may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, a network device, or the like) to perform the methods described in the embodiments of the present disclosure.

Aspects of the present disclosure are described above with reference to flowchart illustrations and/or block diagrams of methods, apparatuses (systems) and machine program products according to embodiments of the present disclosure. It should be understood that each block of the flowchart illustrations and/or block diagrams, and combinations of blocks in the flowchart illustrations and/or block diagrams, can be implemented by programs or instructions. These programs or instructions may be provided to a processor of a general-purpose computer, special-purpose computer, or other programmable data processing apparatus, to generate a machine, such that these programs or instructions, which are executed via the processor of the computer or other programmable data processing apparatus, enable the implementation of implementing the functions/acts specified in one or more blocks of the flowcharts and/or block diagrams. Such a processor may be, but not limited to, a general-purpose processor, a special-purpose processor, an application-specific processor or a field-programmable logic circuit. It should be further noted that, each box in a block diagram and/or a flowchart and a combination of boxes in the block diagram and/or the flowchart may be implemented by using a dedicated hardware configured to perform a specified function or action, or may be implemented by using a combination of dedicated hardware and a computer instruction.

The embodiments of the present disclosure have been described above with reference to the accompanying drawings. The present disclosure is not limited to the specific embodiments described above, and the specific embodiments described above are merely exemplary and not limitative. Those of ordinary skill in the art may make various variations under the teaching of the present disclosure without departing from the spirit of the present disclosure and the protection scope of the claims, and such variations shall all fall within the protection scope of the present disclosure.

What is claimed is:

1. A handover configuration method, applied to a terminal device and comprising:
   receiving target handover configuration information and handover configuration valid information that are sent by a network device, the handover configuration valid information comprising valid area information and/or valid timer information, the valid area information being used for indicating a valid area of at least part of the target handover configuration information, the valid timer information being used for indicating a valid duration of at least part of the target handover configuration information;
   keeping at least part of the target handover configuration information valid in a case that a current cell of the terminal device is located in the valid area; or
   keeping at least part of the target handover configuration information valid in a case that a current moment is within the valid duration; or
   keeping at least part of the target handover configuration information valid in a case that a current cell of the terminal device is located in the valid area and a current moment is within the valid duration; wherein
   the target handover configuration information comprises one or more of following:
   a handover command, a conditional handover trigger condition, a measurement configuration, a measurement target configuration, a measurement report configuration, or a random access channel (RACH) configuration of a candidate cell;
   in a case that the current cell of the terminal device is located in the valid area and handover configuration information incrementally configured by the network device is received, using incrementally configured handover configuration information and keeping handover configuration information that is not incrementally configured in the target handover configuration information valid.

2. The method according to claim 1, wherein the valid area information comprises one or more of following:
   an index of the valid area, a cell identifier corresponding to the valid area, a radio access network notification area configuration corresponding to the valid area, a radio access network notification area corresponding to the valid area, or a tracking area code corresponding to the valid area; and
   the target handover configuration information further comprises mobility control information.

3. The method according to claim 1, wherein
   the valid area information is carried in a system information block (SIB) of a broadcast message, or the valid area information is carried in a dedicated radio resource control (RRC) message, and the dedicated RRC message comprises a handover command, mobility control information or a preset RRC message; and
   the valid timer information is carried in an SIB of a broadcast message, or the valid timer information is carried in a dedicated RRC message, and the dedicated RRC message comprises a handover command, mobility control information or a preset RRC message.

4. The method according to claim 1, wherein the current cell comprises a serving cell of the terminal device, a resident cell in which the terminal device is in an idle state or a resident cell in which the terminal device is in an inactive state.

5. The method according to claim 1, further comprising:
   making the target handover configuration information invalid in a case that the current cell of the terminal device is not located in the valid area; or
   making the target handover configuration information invalid in a case that the current moment is beyond the valid duration.

6. The method according to claim 1, wherein the keeping at least part of the target handover configuration information valid in a case that a current cell of the terminal device is located in the valid area further comprises:
   keeping the target handover configuration information valid in a case that the current cell of the terminal device is located in the valid area and handover configuration information configured or incrementally configured by the network device is not received; or
   using configured handover configuration information in a case that the current cell of the terminal device is located in the valid area and handover configuration information configured by the network device is received.

7. The method according to claim 1, further comprising:
keeping at least part of the target handover configuration information valid in a case that the terminal device successfully accesses a target cell.

8. The method according to claim 7, wherein the keeping at least part of the target handover configuration information valid comprises:
keeping at least part of the target handover configuration information valid in a case that the target cell is located in the valid area; or
keeping handover configuration information corresponding to a cell in the valid area in the target handover configuration information valid in a case that the target cell is located in the valid area.

9. The method according to claim 1, wherein the handover configuration valid information comprises the valid timer information, and the method further comprises:
triggering timing of a timer when the target handover configuration information is received or within a first preset time period after the target handover configuration information is received; or
triggering timing of a timer when the network device sends the target handover configuration information or within a second preset time period after the network device sends the target handover configuration information.

10. A handover configuration method, applied to a network device and comprising:
sending target handover configuration information and handover configuration valid information to a terminal device, the handover configuration valid information comprising valid area information and/or valid timer information, the valid area information being used for indicating a valid area of at least part of the target handover configuration information, the valid timer information being used for indicating a valid duration of at least part of the target handover configuration information; wherein
the target handover configuration information comprises one or more of following:
a handover command, a conditional handover trigger condition, a measurement configuration, a measurement target configuration, a measurement report configuration, or a random access channel (RACH) configuration of a candidate cell; wherein
the method further comprises:
sending incrementally configured handover configuration information to the terminal device, so that the terminal device uses the incrementally configured handover configuration information, and keeps handover configuration information that is not incrementally configured in the target handover configuration information valid.

11. The method according to claim 10, wherein the valid area information comprises one or more of following:
an index of the valid area, a cell identifier corresponding to the valid area, a radio access network notification area configuration corresponding to the valid area, a radio access network notification area corresponding to the valid area, or a tracking area code corresponding to the valid area; and
the target handover configuration information further comprises mobility control information.

12. The method according to claim 10, wherein
the valid area information is carried in a system information block (SIB) of a broadcast message, or the valid area information is carried in a dedicated radio resource control (RRC) message, and the dedicated RRC message comprises a handover command, mobility control information or a preset RRC message; and
the valid timer information is carried in an SIB of a broadcast message, or the valid timer information is carried in a dedicated RRC message, and the dedicated RRC message comprises a handover command, mobility control information or a preset RRC message.

13. The method according to claim 10, wherein
the handover configuration valid information comprises the valid timer information, and the method further comprises:
triggering timing of a timer when the target handover configuration information is sent or within a second preset time period after the target handover configuration information is sent.

14. A terminal device, comprising a processor, a memory, and a computer program stored in the memory and executable on the processor, wherein the computer program, when executed by the processor, causes the terminal device to perform:
receiving target handover configuration information and handover configuration valid information that are sent by a network device, the handover configuration valid information comprising valid area information and/or valid timer information, the valid area information being used for indicating a valid area of at least part of the target handover configuration information, the valid timer information being used for indicating a valid duration of at least part of the target handover configuration information;
keeping at least part of the target handover configuration information valid in a case that a current cell of the terminal device is located in the valid area; or
keeping at least part of the target handover configuration information valid in a case that a current moment is within the valid duration; or
keeping at least part of the target handover configuration information valid in a case that a current cell of the terminal device is located in the valid area and a current moment is within the valid duration; wherein
the target handover configuration information comprises one or more of following:
a handover command, a conditional handover trigger condition, a measurement configuration, a measurement target configuration, a measurement report configuration, or a random access channel (RACH) configuration of a candidate cell;
in a case that the current cell of the terminal device is located in the valid area and handover configuration information incrementally configured by the network device is received, using incrementally configured handover configuration information and keeping handover configuration information that is not incrementally configured in the target handover configuration information valid.

15. The terminal device according to claim 14, wherein the valid area information comprises one or more of following:
an index of the valid area, a cell identifier corresponding to the valid area, a radio access network notification area configuration corresponding to the valid area, a radio access network notification area corresponding to the valid area, or a tracking area code corresponding to the valid area; and the target handover configuration information further comprises mobility control information.

16. The terminal device according to claim 14, the computer program, when executed by the processor, causes the terminal device to further perform:

making the target handover configuration information invalid in a case that the current cell of the terminal device is not located in the valid area; or making the target handover configuration information invalid in a case that the current moment is beyond the valid duration.

17. The terminal device according to claim 14, wherein the computer program, when executed by the processor, causes the terminal device to further perform:

keeping the target handover configuration information valid in a case that the current cell of the terminal device is located in the valid area and handover configuration information configured or incrementally configured by the network device is not received; or using configured handover configuration information in a case that the current cell of the terminal device is located in the valid area and handover configuration information configured by the network device is received.

18. The terminal device according to claim 14, the computer program, when executed by the processor, causes the terminal device to further perform:

keeping at least part of the target handover configuration information valid in a case that the terminal device successfully accesses a target cell.

19. The terminal device according to claim 18, wherein the computer program, when executed by the processor, causes the terminal device to perform:

keeping at least part of the target handover configuration information valid in a case that the target cell is located in the valid area; or keeping handover configuration information corresponding to a cell in the valid area in the target handover configuration information valid in a case that the target cell is located in the valid area.

20. The terminal device according to claim 14, wherein the handover configuration valid information comprises the valid timer information, and the computer program, when executed by the processor, causes the terminal device to further perform:

triggering timing of a timer when the target handover configuration information is received or within a first preset time period after the target handover configuration information is received; or triggering timing of a timer when the network device sends the target handover configuration information or within a second preset time period after the network device sends the target handover configuration information.

* * * * *